INVENTOR.
REINO A. JARVI

ATTORNEYS

United States Patent Office 3,690,979
Patented Sept. 12, 1972

3,690,979
METHOD OF LAYING UP PLYWOOD PANELS
Reino A. Jarvi, Bellevue, Wash., assignor to Simpson Timber Company, Seattle, Wash.
Filed Nov. 18, 1969, Ser. No. 877,603
Int. Cl. B32b *31/06, 31/14*
U.S. Cl. 156—182          7 Claims

ABSTRACT OF THE DISCLOSURE

Plywood panels of five or more plies are layed up by coating the outer plies, i.e. the face and back plies, on one side with a long flow phenolic adhesive, laying one piece cross band veneers over each of the adhesive coated veneers to form a series of two ply sandwiches, coating a sheet of center veneer on both sides with a fast curing adhesive relative to the curing time of the long flow adhesive, laying the adhesive coated center veneer over the uncoated cross band sheet of veneer of one of the two-ply structures and laying a second two-ply structure over the adhesive coated center, the cross band of the second two-ply sandwich contacting the adhesive coated center ply.

BACKGROUND OF THE INVENTION

Field of the invention

This invention relates to a method for making plywood panels of five or more plies.

PRIOR ART RELATING TO THE DISCLOSURE

Plywood panels are made from a series of individual veneers in the form of face veneers, back veneers, center veneers and cross band veneers. The center and cross band veneers are referred to as the inner plies and the face and back veneers are referred to as the outer plies. Traditionally plywood has been made by manual handling of the individual veneers, the core veneers of which are spread on both sides with a suitable plywood adhesive. This operation is termed "plywood layup" and requires four persons to manually handle the individual sheets of veneer. In the usual situation one individual removes pieces of core veneer from a stack and feeds them individually into a roll glue spreader which applies adhesive to both sides and delivers them to a second individual called a "core-layer" who places the individual pieces of adhesive coated core veneer in a proper edge-to-edge alignment on the stack of veneer being assembled for pressing. Working in cooperation with the "core-layer" are two other men who place uncoated sheets of veneer, i.e. back, centers and faces onto the stack in proper sequence and alignment.

Various ways of automating plywood layup have been proposed. Some are now in use such as the method described in U.S. Pat. No. 3,367,823, assigned to Simpson Timber Company, the assignee of the present application. While the method described therein is commercially successful a great deal of capital expense and personnel training is necessary to change a plant from the manual layup of plywood to an automated layup system.

The present invention is directed to a method of rapidly laying up plywood of five or more plies which eliminates the necessity of spreading two or more sets of core veneers and eliminates much of the manual handling of the center veneers. The method also allows use of relatively fast curing adhesives without precure of the outer glue lines exposed to the hot platen surfaces of a plywood press.

SUMMARY OF THE INVENTION

This invention relates to a method of laying up plywood panels. A relatively low molecular weight, long flow alkaline base phenolic adhesive is applied to one side of the outer veneer plies, i.e. the face and back plies, and one piece sheets of uncoated cross band veneers are layed over the adhesive coated face and back plies to form a series of two-ply sandwiches. In a further operation center plies are coated on both sides with a relatively fast curing adhesive. The adhesive coated center ply is dropped onto one of the previously layed up two ply sandwiches to contact the cross band veneer of the two ply sandwich. Over the adhesive coated center ply is layed a second two ply sandwich contacting the adhesive coated center ply. Although primarily useful for laying up five ply plywood panels, the method described herein is applicable to the layup of plywood panels having seven, nine or eleven plies.

DETAILED DESCRIPTION OF THE INVENTION

Very fast exterior hot press plywood adhesives have been developed for use in the layup of plywood. A problem associated with the use of these fast cure adhesives has been precure of the outer glue line exposed to the hot platen surfaces of a conventional plywood press. By laying up plywood according to the present invention precure of the outer glue line is eliminated.

By the method of this invention an adhesive composition including a relatively long flow phenolic resin is applied to the loose side of face and back plies, and sheets of one piece, uncoated cross band veneers layed over the adhesive coated face and back veneers to form a series of two ply sandwiches. In the plywood industry the "loose" side of wood veneer is the inner surface of veneer peeled from a conventional lathe. The adhesive may be applied in any convenient manner such as by curtain coating, roller coating, extrusion or spraying. A curtain coater is preferably used if the layup is to be carried out on a continuous inline basis.

Typically the face, back and cross band veneers are in the form of four foot by eight foot sheets. The sheets of cross band veneer may be in the form of strips of veneer held in edge-to-edge relationship by glass fiber threads adhesively bonded to the surfaces of the cross band veneers as described in U.S. Pat. No. 3,377,223.

Figure 1:
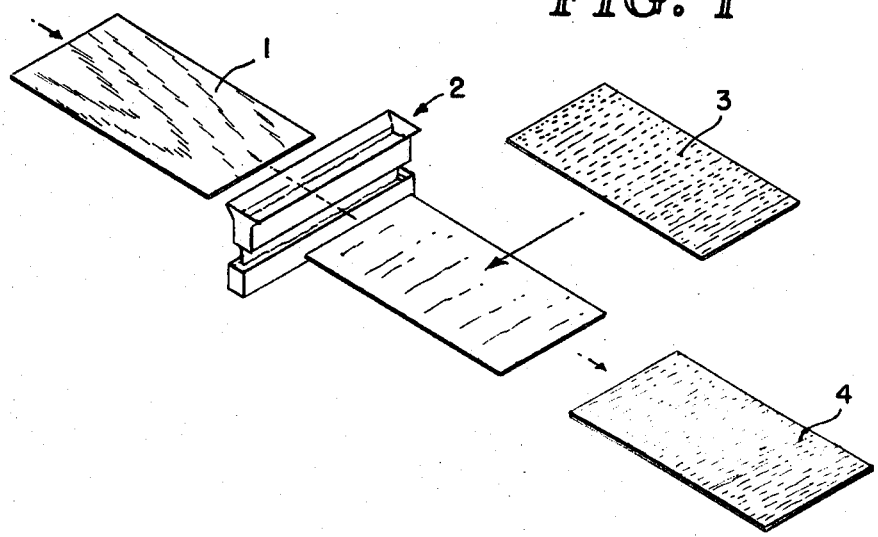
FIG. 1 is a schematic of the method used in laying up of the two ply sandwiches which are further used in the manufacture of five ply plywood panels.

FIG. 1 shows a schematic of the process for making the two ply sandwich panels using a curtain coater to coat the loose side of the face and back veneers. Sheets of face or back veneers 1 are fed through a curtain coater 2 where one side is coated with a relatively long flow phenolic adhesive. One piece sheets of cross band veneers 3 are then layed over the adhesive coated surface of the face or back veneers to form a two ply sandwich 4.

The phenolic resins of the adhesive compositions used to coat the face and back veneers should be capable of flowing and curing in a conventional hot press to give a good bond several days after spreading. By using such a long flow adhesive not only are problems of precure eliminated but the two ply sandwiches can be layed up in a separate operation and stored for use at some future date without danger of precure of the adhesive. A preferred phenolic resin is one made by condensing in an aqueous media formaldehyde and phenol in a mole ratio of from 1.8 to 1 to 2.2 to 1 in the presence of an alkaline catalyst, preferably sodium hydroxide. The amount of catalyst expressed as equivalent to sodium hydroxide, should not be greater than about five weight percent based on the total weight of the constituents of the resin. The final resin should have a solids content of about fifty plus or minus two percent and a stroke cure at 300° F. of ten to fourteen seconds. To the phenolic resin are added water, conventional fillers, etc. to form the adhesive composition. If a curtain coater is used to coat the face and back veneers, the preferred adhesive composition is one made by (1) adding 35 parts by weight hot water to 2 parts by weight methylcellulose, (2) adding about 232 parts by weight cold water, (3) adding the solution of (1) and (2) to 1,000 parts by weight of the phenolic resin described previously, and (4) adding 50 parts by weight of a surface active agent such as the sodium salt of dodecyldiphenyl ether disulfonic acid.

Figure 2:
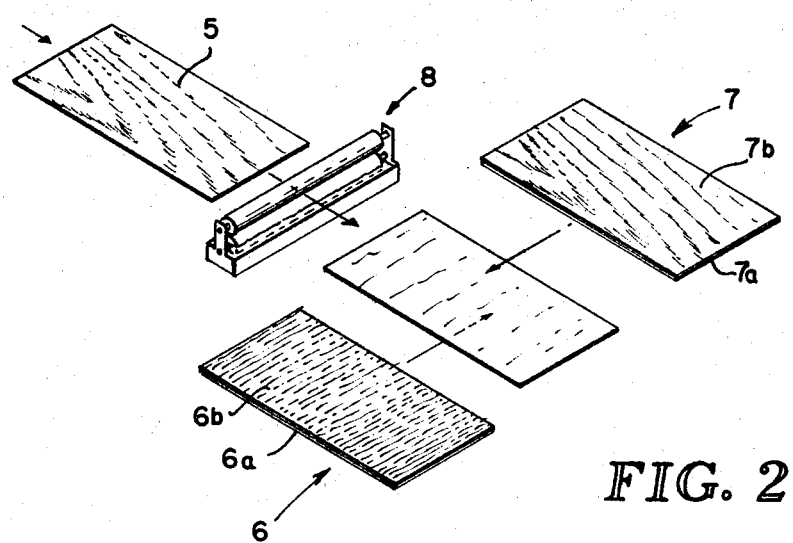
FIG. 2 is a schematic illustrating layup of five ply plywood panels using a center ply coated on both sides with adhesive and two-ply sandwiches layed up in the manner shown in FIG. 1.

FIG. 2 illustrates the method of laying up 5 ply plywood panels using a center ply 5 coated on both sides with a relatively fast curing phenolic adhesive composition, and two of the two-ply sandwiches 6 and 7 made as described previously. The sheets of center veneer 4 may be in the form of a four foot by eight foot sheet or as two two-foot by eight foot sheets. To coat both sides of the center veneer with the adhesive it is fed through a conventional double roll spreader 8. Prior to feeding of the center veneer through the spreader a two-ply sandwich 6 consisting of a back 6a and cross band 6b is positioned on an assembly table in front of the spreader with the cross band facing upwardly. The adhesive coated center veneer is then layed over the two ply sandwich 6 and a second two ply sandwich 7 consisting of a face 7b and cross band 7b is layed over the center veneer with the cross band contacting the adhesive coated surface of the center veneer. The process is continued until the desired number of plywood panels have been layed up for delivery to the plywood press.

If it is desired to make seven ply plywood a stack of cross band veneers are placed on an assembly table adjacent the double roll spreader. An adhesive coated center veneer is layed over a two ply sandwich as described previously followed by an uncoated one piece cross band layed over the center veneer. Following this a second adhesive coated center veneer is layed over the cross band followed by a second two ply sandwich. In like fashion 9 or 11 ply plywood can be made.

The phenolic adhesive used to coat the center veneers should have a fast cure time relative to the curing time of the phenolic adhesive used to coat the face and back veneers of the two-ply sandwiches. Rapid curing phenolic adhesives of the type preferred typically have a resin solids content of about 40 to 50%. These resins are highly advanced, high molecular weight phenolic resins formulated generally in accordance with those described in U.S. Pat. No. 2,457,493, Re. 23,347, and are referred to as Redfern type resins. These resins are usually extended with conventional extenders and mixed with 10 to 15% base or resin solids of spray dried blood. In lieu of the blood a boron compound such as sodium borate may be mixed with the resin in amounts up to 0.25% based on resin solids.

Although the method described can be carried out in two separate operations, i.e. laying up of a series of two ply sandwiches, followed by use of the two ply sandwiches to layup the final plywood panels, the method can be carried out on a continuous inline basis with curtain coating of the face and back veneers and glue spreading of the other veneers.

Since the cure time of the glue line in the outer plies is greater than that of the inner plies precure of the outer glue line during hot pressing of the plywood panels is eliminated. Lighter spreads of adhesive on the center veneers can be used than is used in conventional layup methods, thereby (1) decreasing the amount of pressing time since less water is present in the combined glue lines and (2) reducing the tendency of the panels to blister or blow in the hot press. The number of passes of veneer through a glue spreader is substantially reduced by the instant method over conventional layup methods, resulting in savings of time and labor. Plywood panels produced in accordance with the method described herein, on the average, have superior properties to that layed up in conventional manner due to fewer core gaps and better bonding.

The embodiments of the invention in which an exclusive property or privilege is claimed are defined as follows:

1. A method for the lay-up of component assemblies to make plywood panels of 5-plies comprising:
   (1) positioning a series of preassembled individual 2-ply sandwiches consisting of an outer veneer sheet and a registered one-piece cross band having its grain direction transverse to the grain direction of the outer veneer sheet, at a stacking station the veneer sheets held together with a substantially uncured adhesive composition containing a long flow phenolic resin allowing storage of 2-ply sandwiches for a limited amount of time without danger of precure of the resin,
   (2) depositing one of the 2-ply sandwiches with the cross-band facing upwardly at a stacking station,
   (3) depositing over the 2-ply sandwich a center veneer coated on both sides with an adhesive composition containing a fast curing phenolic resin relative to cure time of the long flow phenolic adhesive, the center veneer having its grain direction extending transversely to the grain direction of the cross band of the 2-ply sandwich and having its edges substantially registered with the corresponding edges of the 2-ply sandwich, and
   (4) depositing over the adhesive coated center veneer a second 2-ply sandwich with the cross-band thereof contacting the adhesive coated center veneer, the improvement comprising essentially the use of two adhesives with substantially different curing times which enable the cover sheets to be preassembled and the resultant laid-up plywood panel to be cured without pre-cure of the outer veneer adhesive composition.

2. The process of claim 1 wherein the long flow phenolic resin has a formaldehyde to phenol mole ratio of 1.8 to 1 to 2.2 to 1, a solids content of 50±2%, a stroke cure at 300° F. of 10 to 14 seconds and an amount of catalyst, expressed as equivalent to sodium hydroxide of not greater than 5 weight percent based on the total weight of the constituents of the resin, and the fast curing phenolic adhesive is a highly advanced, high molecular weight resin having a solids content of from 40 to 50%.

3. A method for the lay-up of rectangular component assemblies to make plywood panels of 5-plies using a combination of phenolic resins to substantially eliminate precure of the outer glue lines of the laid-up assembly during pressing in a plywood press, comprising:
   (1) providing individual veneer sheets suitable for outer plies,
   (2) coating the upper face only of the outer veneer sheets with an adhesive composition containing a long flow phenolic resin which can be stored for relatively long periods of time without danger of precure,
   (3) laying over each of the adhesive coated veneer sheets one-piece cross-band veneer sheets in registry with the adhesive coating sheets, the cross-band veneers having their grain direction extending transversely to the grain direction of the outer sheets to form a series of 2-ply sandwiches consisting of an outer veneer and a one-piece cross-band held together with a substantially uncured adhesive composition,
   (4) depositing one of the 2-ply sandwiches with cross-band facing upwardly at a stacking station, (5) depositing over the 2-ply sandwich a center veneer coated on both sides with an adhesive composition containing a fast curing phenolic resin relative to the cure time of the long flow phenolic resin, the center veneer having its grain direction extending transversely to the grain direction of the cross-band of the 2-ply sandwich and having its edges substantially registered with corresponding edges of the 2-ply sandwich, (6) depositing over the adhesive coated center veneer at a second 2-ply sandwich with the cross-band thereof contacting the adhesive coated center veneer, and (7) delivering the laid-up panel to a plywood press.

4. The method of claim 3 wherein the long flow phenolic resin has a formaldehyde to phenol mole ratio of 1.8 to 1 to 2.2 to 1, a solids content of 50±2%, a stroke cure at 300° F. of 10 to 14 seconds and an amount of catalyst, expressed as equivalent to sodium hydroxide of not greater than 5 weight percent based on the total weight of the constituents of the resin, and the fast curing phenolic adhesive is a highly advanced, high molecular weight resin having solids content of from 40 to 50%.

5. The method of claim 3 wherein coating of the outer plies with the adhesive composition is by passage thereof through an unbroken curtain of liquid adhesive.

6. A method for the lay-up of component assemblies to make plywood panels of seven or more plies using a combination of phenolic resins to substantially eliminate precure of the outer glue lines of the laid-up assembly during pressing in a plywood press, comprising:

(1) providing a series of individual 2-ply sandwiches consisting of an outer veneer and a registered one-piece cross-band having its grain direction extending transversely to the grain direction of the outer veneer, the outer veneer and cross-band held together with a substantially uncured adhesive composition containing a long-flow phenolic resin allowing storage of the 2-ply sandwiches for a limited amount of time without danger of precure of the resin, (2) depositing one of the 2-ply sandwiches with the cross-band thereof facing upwardly at a stacking station, (3) depositing over the 2-ply sandwich a first center veneer coated on both sides with an adhesive composition containing a fast curing phenolic resin relative to the curing time of the long flow phenolic resin, the center veneer having its grain direction extending transversely to the grain direction of the cross-band of the 2-ply sandwich and having its edges substantially registered with corresponding edges of the 2-ply sandwich, (4) depositing an uncoated second center veneer over the upper surface of the adhesive coated first center veneer with its grain direction extending transversely to the grain direction of the first center veneer and with its edges substantially registered with the corresponding edges of the first center veneer, (5) depositing a third center veneer over the uncoated upper surface of the second center veneer, the third center veneer coated on both sides with an adhesive composition containing a fast curing phenolic resin and having its grain direction extending parallel to the grain direction of the first center veneer, and (6) depositing over the adhesive-coated third center veneer a second 2-ply sandwich with the cross-band thereof contacting the adhesive-coated third center veneer.

7. The method of claim 6 including repeating steps (4) and (5) as desired for manufacture of plywood panels containing 9, 11 or more plies.

References Cited

UNITED STATES PATENTS

| | | | |
|---|---|---|---|
| Re. 23,347 | 3/1951 | Redfern | 260—57 |
| 2,323,105 | 6/1943 | Welch | 156—264 |
| 3,367,823 | 2/1968 | Clausen et al. | 156—557 X |
| 3,384,137 | 5/1968 | Ash | 144—309 |
| 2,772,197 | 11/1956 | Kozdemba | 144—309 X |
| 3,042,563 | 7/1962 | Shearer et al. | 156—182 X |

CARL D. QUARFORTH, Primary Examiner

E. E. LEHMANN, Assistant Examiner

U.S. Cl. X.R.

144—309 Q; 156—313, 335